(12) United States Patent
Wu et al.

(10) Patent No.: US 10,666,397 B2
(45) Date of Patent: May 26, 2020

(54) METHOD AND APPARATUS FOR CONTROL SIGNALING

(71) Applicant: MEDIATEK INC., Hsinchu (TW)

(72) Inventors: Wei-De Wu, Hsinchu (TW); Pei-Kai Liao, Mingjian Xiang (TW); Chien-Hwa Hwang, Zhubei (TW)

(73) Assignee: MEDIATEK INC., Hsinchu (TW)

( * ) Notice: Subject to any disclaimer, the term of this patent is extended or adjusted under 35 U.S.C. 154(b) by 3 days.

(21) Appl. No.: 15/475,950

(22) Filed: Mar. 31, 2017

(65) Prior Publication Data
US 2017/0289971 A1    Oct. 5, 2017

Related U.S. Application Data

(60) Provisional application No. 62/316,615, filed on Apr. 1, 2016.

(51) Int. Cl.
| | |
|---|---|
| *H04W 72/04* | (2009.01) |
| *H04L 1/16* | (2006.01) |
| *H04L 5/00* | (2006.01) |
| *H04L 27/26* | (2006.01) |

(Continued)

(52) U.S. Cl.
CPC .......... *H04L 1/1671* (2013.01); *H04L 5/0053* (2013.01); *H04L 5/0055* (2013.01); *H04L 5/0094* (2013.01); *H04L 27/2647* (2013.01); *H04L 27/2649* (2013.01); *H04W 72/042* (2013.01); *H04W 72/0453* (2013.01); *H04L 1/0045* (2013.01); *H04L 1/1614* (2013.01); *H04L 1/1621* (2013.01); *H04L 1/1845* (2013.01)

(58) Field of Classification Search
CPC ..................... H04W 72/042; H04W 723/0453
See application file for complete search history.

(56) References Cited

U.S. PATENT DOCUMENTS

| | | | | |
|---|---|---|---|---|
| 7,443,826 B1 * | 10/2008 | Atarius | ................ | H04B 1/7087 370/342 |
| 2011/0274074 A1 * | 11/2011 | Lee | ........................ | H04L 5/0053 370/329 |

(Continued)

OTHER PUBLICATIONS

Combined Office Action and Search Report dated Nov. 14, 2018 in Taiwanese Patent Application No. 107108932 (with English language translation of categories of cited documents).

*Primary Examiner* — Zhiren Qin
(74) *Attorney, Agent, or Firm* — Oblon, McClelland, Maier & Neustadt, L.L.P.

(57) ABSTRACT

Aspects of the disclosure provide an apparatus that includes a receiving circuit and a baseband processing circuit. The receiving circuit is configured to receive signals transmitted from another apparatus to the apparatus and generate digital samples in response to the received signals. The received signals have a plurality of frequency sub-bands allocated as transmission resources. A specific frequency sub-band is allocated to the apparatus to carry data and control information to the apparatus. The baseband processing circuit is configured to receive the digital samples, process the digital samples to generate symbols in the respective frequency sub-bands, and decode the symbols in the respective frequency sub-bands to determine the specific frequency sub-band that is allocated to the apparatus.

20 Claims, 5 Drawing Sheets

(51) Int. Cl.
*H04L 1/00* (2006.01)
*H04L 1/18* (2006.01)

(56) References Cited

U.S. PATENT DOCUMENTS

| | | | |
|---|---|---|---|
| 2012/0028668 A1* | 2/2012 | Lee | H04L 5/0053 |
| | | | 455/509 |
| 2013/0188552 A1* | 7/2013 | Kazmi | H04L 5/001 |
| | | | 370/315 |
| 2014/0328302 A1 | 11/2014 | Park et al. | |
| 2018/0006787 A1* | 1/2018 | Chen | H04L 5/0051 |

* cited by examiner

METHOD AND APPARATUS FOR CONTROL SIGNALING

INCORPORATION BY REFERENCE

This present disclosure claims the benefit of U.S. Provisional Application No. 62/316,615, "Data Channel and Control Channel Enhancement for Wireless Network" filed on Apr. 1, 2016, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In a wireless communication network, a network provider can use a shared channel to transmit data to one or more user equipment. In an example, the network provider provides downlink control information of the shared channel to the one or more user equipment. Then the one or more user equipment can receive data transmitted by the shared channel according to the downlink control information.

SUMMARY

Aspects of the disclosure provide an apparatus that includes a receiving circuit and a baseband processing circuit. The receiving circuit is configured to receive signals transmitted from another apparatus to the apparatus and generate digital samples in response to the received signals. The received signals have a plurality of frequency sub-bands allocated as transmission resources. A specific frequency sub-band is allocated to the apparatus to carry data and control information to the apparatus. The baseband processing circuit is configured to receive the digital samples, process the digital samples to generate symbols in the respective frequency sub-bands, and decode the symbols in the respective frequency sub-bands to determine the specific frequency sub-band that is allocated to the apparatus.

According to an aspect of the disclosure, the baseband processing circuit is configured to decode symbols at predetermined resource elements in the respective frequency sub-bands to determine the specific frequency sub-band that is allocated to the apparatus. In an example, the specific frequency sub-band is allocated to the apparatus to carry downlink control information for the apparatus. The downlink control information may include at least one of modulation and coding scheme, redundancy version, transmit power control command for uplink control channel, precoding information, etc.

In an embodiment, the baseband processing circuit is configured to decode the symbols in the respective frequency sub-bands based on an identifier of the apparatus to determine the specific frequency sub-band that is allocated to the apparatus.

According to an aspect of the disclosure, the specific frequency sub-band is allocated to the apparatus to carry the control information that is indicative of a common configuration with another frequency sub-band. In an example, the other frequency sub-band is configured not to carry control information of the common configuration.

Aspects of the disclosure provide a method of communication. The method includes receiving, signals transmitted from a first apparatus to a second apparatus. The signals have a plurality of frequency sub-bands allocated as transmission resources. A specific frequency sub-band is allocated to the second apparatus to carry data and control information to the second apparatus. The method includes generating digital samples in response to the received signals, processing the digital samples to generate symbols in the respective frequency sub-bands, and decoding the symbols in the respective frequency sub-bands to determine the specific frequency sub-band that is allocated to the second apparatus.

Aspects of the disclosure provide an apparatus that includes a baseband processing circuit and a transmitting circuit. The baseband processing circuit is configured to encode control information to another apparatus with data to the other apparatus into symbols in a specific frequency sub-band that is allocated to the other apparatus, and generate a digital stream based on the symbols in the frequency sub-band and symbols in other frequency sub-bands. The transmitting circuit is configured to transmit signals in response to the digital stream.

Aspects of the disclosure provide a method for communication. The method includes encoding, by a first apparatus, control information to a second apparatus with data to the second apparatus into symbols in a specific frequency sub-band that is allocated to the second apparatus, generating a digital stream based on the symbols in the specific frequency sub-band and symbols in other frequency sub-bands and transmitting wireless signals in response to the digital stream.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
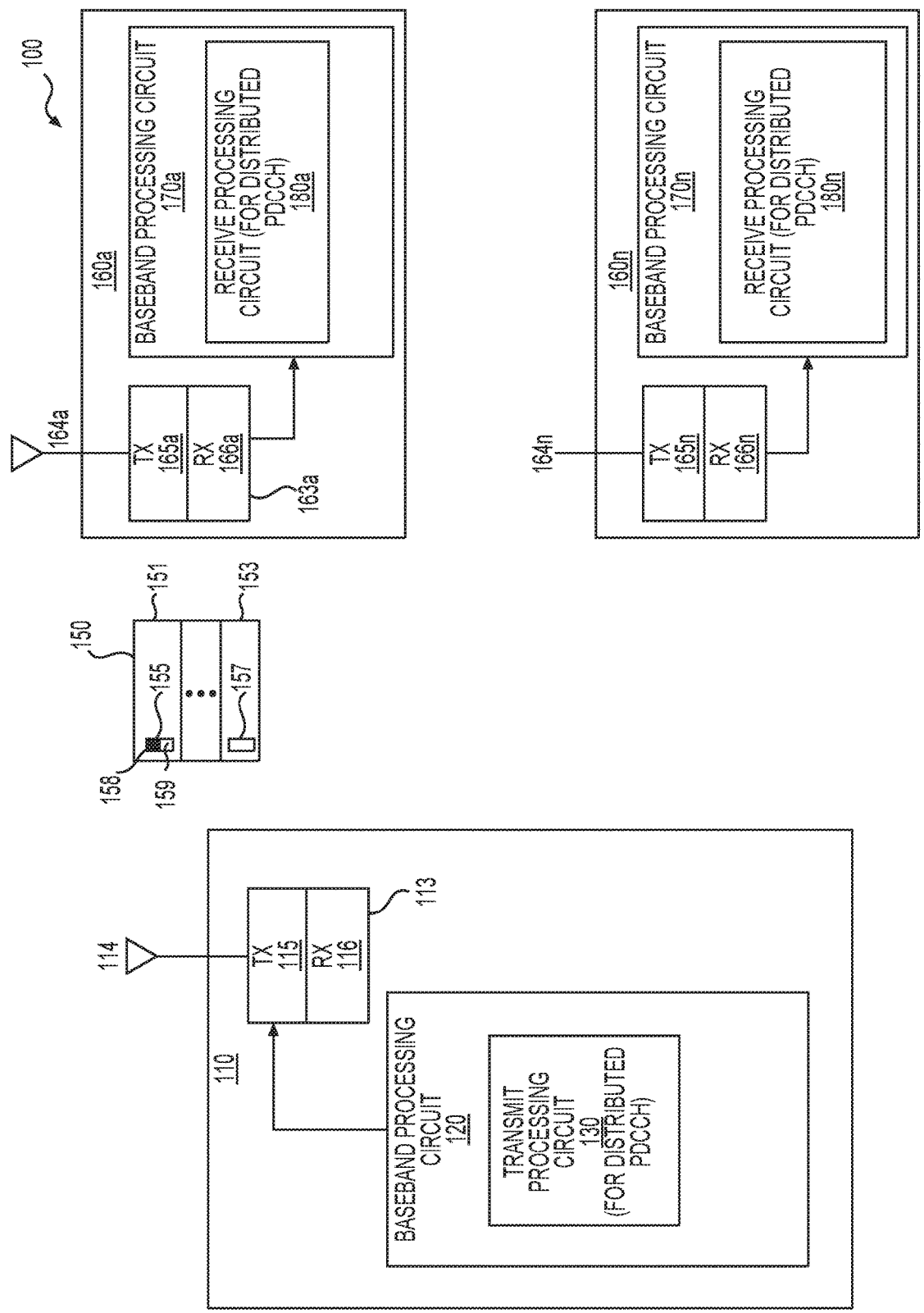
FIG. 1 shows a block diagram of an exemplary communication system 100 according to an embodiment of the disclosure.

FIG. 1 shows a block diagram of an exemplary communication system 100 according to an embodiment of the disclosure. The communication system 100 includes a first electronic device 110 that communicates with one or more second electronic devices 160a-160n using a shared channel. The first electronic device 110 is configured to use a distributed physical downlink control channel (PDCCH) to provide control information to the second electronic devices 160a-160n. The second electronic devices 160a-160n are respectively configured to monitor control channel candidates to extract the control information.

In an embodiment, frequency sub-bands are allocated to the second electronic devices 160a-160n. The first electronic device 110 is configured to use resource elements in a frequency sub-band to provide control information to a second electronic device that is allocated with the frequency sub-band. Further, according to an aspect of the disclosure, the second electronic devices 160a-160n are respectively configured to monitor the frequency sub-bands to determine resources (e.g., the frequency sub-bands) that are allocated to the respective second electronic devices 160a-160n, and determine the control information for the respective second electronic devices 160a-160n. Then, the second electronic devices 160a-160n can perform communication based on the control information and the allocated resources.

The communication system 100 can be any suitable wireless communication system that uses suitable wireless communication technology, such as second generation (2G) mobile network technology, third generation (3G) mobile network technology, fourth generation (4G) mobile network technology, fifth generation (5G) mobile network technology, global system for mobile communication (GSM), long-term evolution (LTE), a New Radio (NR) access technology, a wireless local area network (WLAN), and the like.

In an embodiment, the first electronic device 110 is an interface node, such as a base transceiver station, a Node B, an evolved Node B, and the like, in a telecommunication service provider. The first electronic device 110 includes hardware components and software components configured to enable wireless communications between the first electronic device 110 and the second electronic devices 160a-160n that have subscribed services of the telecommunication service provider. The first electronic device 110 is suitably coupled with other nodes, such as core nodes in a backbone of the telecommunication service provider, other interface nodes of the telecommunication service provider, and the like.

Further, in an embodiment, the second electronic devices 160a-160n are terminal devices. In an example, a terminal device is user equipment used by an end-user for mobile telecommunication, such as a cell phone, a smart phone, a tablet computer, a laptop, a wearable device and the like. In another example, a terminal device is a stationary device, such as a desktop computer. In another example, a terminal device is a machine type communication device, such as a wireless sensor, an Internet of things (IoT) device and the like.

According to an aspect of the disclosure, the first electronic device 110 is configured to use a shared channel in the physical layer to transmit information, such as data and the like, to the second electronic devices 160a-160n. In an example, the shared channel to transmit information from the first electronic device 110 to the second electronic devices 160a-160n is referred to as a physical downlink shared channel (PDSCH). The control information is referred to as downlink control information (DCI).

In an embodiment, the shared channel is configured to support time division multiplexing (TDM) and/or frequency division multiplexing (FDM).

In the frequency domain, in an example, sub-carriers are defined in the frequency domain according to a sub-carrier spacing. In an example, a carrier of 20 MHz bandwidth can include 1200 sub-carriers according to 15 KHz sub-carrier spacing. In another example, a carrier of 160 MHz bandwidth can include 2400 sub-carriers according to 60 KHz sub-carrier spacing. Further, in an example, the carrier can be divided into sub-bands in the frequency domain. The sub-bands can have the same or different number of sub-carriers. In an example, a carrier of 160 MHz bandwidth can be divided into 20 sub-bands of the same bandwidth per sub-band, thus each sub-band includes 120 sub-carriers.

In the time domain, in an example, the first electronic device 110 is configured to structure transmission in the time duration as radio frames. In an example, each radio frame is 10 ms long and consists of ten sub-frames of 1 ms each. In another example, each radio frame is 10 ms long and consists of forty sub-frames of 0.25 ms each. A sub-frame can be further divided into for example 2 time slots, and a time slot can be divided into 7 symbol periods in an example.

In an embodiment, transmission resources of a shared channel are allocated in time and frequency domains. For example, in the two dimensional time and frequency domain, a resource element (RE) is made up of a symbol in the time domain and a sub-carrier in the frequency domain. Further, in an example, a physical resource block (PRB) is made up of a slot in the time domain and 12 sub-carriers in the frequency domain.

According to an aspect of the disclosure, the first electronic device 110 is configured to allocate transmission resources of a shared channel (e.g., sub-frame) by frequency sub-bands. Further, the first electronic device 110 uses a distributed PDCCH with control information distributed according to the frequency sub-bands to deliver the control information. In an embodiment, the frequency domain is partitioned into, for example 20 sub-bands of the same sub bandwidth. The first electronic device 110 is configured to distribute the control information by the frequency sub-bands. Thus, in an example, control information in a specific frequency sub-band does not need to specify resource allocation above the frequency sub-band level, thus the control information occupies less resource elements. In an embodiment, the saved resource elements can be used for other usage, such as sending more data.

According to an aspect of the disclosure, the distributed PDCCH in a sub-frame includes one or more control resource sets to delivering down link control information. A control resource set is a set of resource element groups (REGs). The bandwidth of the control resource set is smaller than or equal to the carrier bandwidth. The control resource set may or may not be frequency contiguous. The control resource set can span one or more symbol durations.

In an embodiment, each frequency sub-band includes certain resource elements that are control channel candidates for the distributed PDCCH. The distributed PDCCH selectively uses control channel candidates to deliver the control information. In an example, a control channel candidate includes a plurality of control channel elements, and a control channel element includes a fixed number of REGs, such as 9 REGs. In an embodiment, the control channel candidates can be selected to deliver control information, and can be used to deliver non-control information, such as data to one or more second electronic devices. In an example, control channel candidates in a frequency sub-band is a control resource set.

In an example, the control channel candidates for the physical downlink control channel are pre-determined, thus the second electronic devices 160a-160n have the knowledge of the locations of the control channel candidates in the time and/or frequency domain. In another example, the control channel candidates for the physical downlink control channel are determined by the first electronic 110, and the first electronic device 110 informs the second electronic devices 160a-160n of the control channel candidates for the physical downlink control channel by a suitable technology, such as additional control signal in the control resource set or out of the control resource set.

Specifically, in the FIG. 1 example, the first electronic device 110 transmits a radio frame that includes a sub-frame 150. The sub-frame 150 includes multiple frequency sub-bands 151-153 in the frequency domain. In an example, a frequency sub-band includes a plurality of resource elements that are the control channel candidates and can be used for transmitting control information. In an embodiment, the plurality of resource elements are located at predetermined position in the time-frequency domain.

In the FIG. 1 example, the frequency sub-band 151 includes a control resource set 155 having control channel candidates that can be selectively used for delivering control information. For example, a portion 158 of the control resource set 155 is used for delivering control information, another portion 159 of the control resource set 155 is used for delivering data, and the control resource set 157 is used for delivering data. In an embodiment, the portion 158 of the control resource set 155 is used to provide control information specific for the frequency sub-band 151. The control information in the frequency sub-band 151 does not specify resource allocation above the frequency sub-band level, thus resource elements can be saved. In an embodiment, the saved resource elements can be used for other usage, such as sending data.

Generally, a sub-frame in the downlink carries downlink control information (DCI) about data transmission in the current sub-frame and further transmissions.

In a related example, a centralized PDCCH is used to transmit downlink control information. In the related example, the centralized PDCCH occupies first one or two or three symbols in the time domain, and occupies across most of the frequency domain to deliver DCI messages. For example, when the number of second electronic devices 160a-160n is less than a first threshold (e.g., 10), the centralized PDCCH occupies the first symbol in the time domain, and occupies across most of the frequency domain; when the number of second electronic devices 160a-160n is between the first threshold and a second threshold (e.g., 20), the centralized PDCCH occupies the first two symbols in the time domain, and occupies across most of the frequency domain; and when the number of second electronic devices 160a-160n is between the second threshold and a third threshold (e.g., 30), the centralized PDCCH occupies the first three symbols in the time domain, and occupies across most of the frequency domain.

In the related example, each DCI message includes downlink control information for a second electronic device (or a group of second electronic devices). The DCI message includes a relatively large number of bits for resource allocation for the second electronic device. For example, resources in a sub-frame are allocated in the units of resource block groups (RBG). In an example, an RBG includes four PRBs. When the sub-frame includes for example 25 RBGs in the frequency domain, the DCI message includes 25 bits to respectively represent assignments of the 25 RBGs to the second electronic device, and the total number of bits in the DCI message is 67 bits in an example.

In the FIG. 1 example that uses the distributed PDCCH, the control information is distributed in the frequency sub-bands, bits irrelevant to the specification within frequency sub-band, such as bits for specifying the frequency sub-band, can be removed from the control information. For example, when a frequency sub-band has 10 PRBs of 8 assignment configurations, the control information in the frequency sub-band can use 3 bits to represent resource allocation within the frequency sub-band. Thus, the example in FIG. 1 can save 22 bits for representing resource assignments in an example.

In addition, according to an aspect of the disclosure, when the control information is distributed in the frequency sub-bands, the total resources for sending all the control information in the sub-frame is relatively linear to the number of second electronic devices 160a-160n. In the FIG. 1 example, the frequency sub-band 151 and the frequency sub-band 153 have a common configuration, for example when both are allocated to the same second electronic device, the control information in the portion 158 of the control resource set 155 can be used for the frequency sub-band 153. Thus, the control channel candidates 157 can be used for data delivery.

In the related example, when the number of the second electronic devices 160a-160n is between for example 10 to 20, a relatively fixed amount of resources, such as resources in two symbol periods and across the frequency domain, that is not dependent on the number of the second electronic devices 160a-160n, is used for delivering control information.

According to an aspect of the disclosure, the second electronic devices 160a-160n receive the sub-frame 150, the second electronic devices 160a-160n are respectively configured to monitor the frequency sub-bands 151-153, blind decode the control resource sets 155-157, and determine the control information and the resource assignments based on the blind decoding.

In an embodiment, when the frequency sub-band 151 is allocated to the second electronic device 160a, the frequency sub-band 151 is encoded to be indicative of the second electronic device 160a. For example, some bits, such as cyclic redundancy check (CRC) bits in the frequency sub-band 151 is masked (e.g., using XOR operation) based on an identifier (e.g., radio network temporary identifier) of the second electronic device 160a.

In the embodiment, the second electronic device 160a monitors the sub-bands 151-153, and blind-decodes the control resource sets 155-157. During the blind-decoding, in an example, the second electronic device 160a uses its own identifier to de-mask the control resource sets 155-157. Further, in an embodiment, the second electronic device 160a can decode the control resource sets 155-157 according to a plurality of formats. In an example, when the control resource set 155 is decoded successfully according to one of the formats, the second electronic device 160a can determine the resource allocation and encoding format based on the blind decoding success, and extract the control information delivered by the control resource set 155.

It is noted that, the other second electronic devices can operate similarly as the second electronic device 160a.

According to an aspect of the disclosure, the communication system 100 can achieve various advantages, such as easy implementation of link adaptation over frequency, grouping optimization of multi-user per sub-band for multiple input, multiple output (MIMO) and non-orthogonal multiple access (NOMA) gain.

Specifically, in the FIG. 1 example, the first electronic device 110 includes a first transceiver 113 and a first baseband processing circuit 120 coupled together. In the example, the first baseband processing circuit 120 includes a transmit processing circuit 130 for the distributed PDCCH. The first electronic device 110 can include other suitable components (not shown), such as processors, memory, and the like.

The second electronic device 160a includes a second transceiver 163a and a second baseband processing circuit 170a coupled together. The second baseband processing circuit 170a includes a receive processing circuit 180a for the distributed PDCCH. The second electronic device 160a can include other suitable components (not shown), such as processors, memory, and the like. Other second electronic devices are configured similarly as the second electronic device 160a.

It is noted that the first baseband processing circuit 120 can include other suitable components, such as a receive processing circuit (not shown) and the like. Similarly, the second baseband processing circuit 170a can include other suitable components, such as a transmit processing circuit (not shown) and the like.

The first transceiver 113 is configured to receive and transmit wireless signals. In an example, the first transceiver 113 includes a receiving circuit RX 116 and a transmitting circuit TX 115. The receiving circuit RX 116 is configured to generate electrical signals in response to captured electromagnetic waves by an antenna 114, and process the electrical signals to extract digital samples from the electrical signals. For example, the receiving circuit RX 116 can filter, amplify, down convert, and digitalize the electrical signals to generate the digital samples. The receiving circuit RX 116 can provide the digital samples to the first baseband processing circuit 120 for further processing.

In an example, the transmitting circuit TX 115 is configured to receive digital stream (e.g., output samples) from the first baseband processing circuit 120, process the digital stream to generate radio frequency (RF) signals, and cause the antenna 114 to emit electromagnetic waves in the air to carry the digital stream. In an example, the transmitting circuit TX 115 can convert the digital stream to analog signals, and amplify, filter and up-convert the analog signals to generate the RF signals.

According to an aspect of the disclosure, the transmit processing circuit 130 is configured to receive downlink control information and encode the downlink control information according to the distributed PDCCH. Further, the transmit processing circuit 130 is configured to suitably encode data, and generate a digital stream (e.g., output samples) in response to the encoded data and downlink control information.

In an embodiment, the transmit processing circuit 130 is configured to receive downlink control information message for a second electronic device, such as for the second electronic device 160a, or for a group of second electronic devices, and perform channel coding on the downlink control information to generate encoded control bits. In an example, the transmit processing circuit 130 is configured to insert cyclic redundancy check (CRC), and conduct rate matching and the like to generate the encoded control bits. In an example, the transmit processing circuit 130 masks the CRC bits with an identifier, such as an identifier of the second electronic device 160a, a system information identifier, and the like.

Then, in an example, the transmit processing circuit 130 is configured to map the encoded control bits to one or more control resource sets according to the distributed PDCCH format. For example, the transmit processing circuit 130 is configured to perform quadrature phase shift keying (QPSK) modulation, and generate orthogonal frequency-division multiplexing (OFDM) symbols for the encoded control bits. Then, the transmit processing circuit 130 can map the OFDM symbols into one or more control resource sets in a frequency sub-band that is allocated to the second electronic device 160a.

It is noted that the transmit processing circuit 130 can encode DCI messages for respective second electronic devices into frequency sub-bands that are respectively allocated to the second electronic devices.

According to an aspect of the disclosure, the transmit processing circuit 130 can also process the data according to suitable channel coding technique, such as error detection coding technique, rate matching coding technique, low density parity check (LDPC) coding technique, polar coding technique and the like. The processed the data is suitably modulated and multiplexed. In an example, the data can be modulated using suitable modulation technique, such as quadrature phase shift keying (QPSK) and the like, and can be multiplexed using suitable multiplexing technique, such as orthogonal frequency-division multiplexing (OFDM) and the like. Then, the modulated symbols are interleaved and mapped to physical resource elements (REs) allocated for data transmission.

The transmit processing circuit 130 then generates the digital stream based on the resource element mapping results of the data processing and the downlink control information processing.

It is noted that the transmit processing circuit 130 can perform other suitable functions, such as scrambling, and the like. It is noted that the transmit processing circuit 130 can be implemented using various techniques. In an example, the transmit processing circuit 130 is implemented as integrated circuits. In another example, transmit processing circuit 130 is implemented as one or more processors executing software instructions.

The second transceiver 163a is configured to receive and transmit wireless signals. In an example, the second transceiver 163a includes a receiving circuit RX 166a and a transmitting circuit TX 165a. The receiving circuit RX 166a is configured to generate electrical signals in response to captured electromagnetic waves by an antenna 164a, and process the electrical signals to extract digital samples from the electrical signals. For example, the receiving circuit RX 166a can filter, amplify, down convert, and digitalize the electrical signals to generate the digital samples. The receiving circuit RX 166a can provide the digital samples to the second baseband processing circuit 170a for further processing.

In an example, the transmitting circuit TX 165a is configured to receive a digital stream (e.g., output samples) from the second baseband processing circuit 1170a, process the digital stream to generate radio frequency (RF) signals, and cause the antenna 164a to emit electromagnetic waves in the air to carry the digital stream. In an example, the transmitting circuit TX 165a can convert the digital stream to analog signals, and amplify, filter and up-convert the analog signals to generate the RF signals.

According to an aspect of the disclosure, the receive processing circuit 180a is configured to receive the digital samples from the receiving circuit RX 166a, process the digital samples to generate symbols in the respective frequency sub-bands, decode the symbols in the respective frequency sub-bands to determine the specific frequency sub-band that is allocated to the second electronic device 160a, and extract the downlink control information for the second electronic device 160a.

In an embodiment, the receive processing circuit 180a is configured to receive the digital samples, and perform demodulation on the digital samples to generate symbols for resource elements in the two dimensional time frequency domain. Further, the receive processing circuit 180a is configured to blind-decode symbols at the control channel candidates according to the distributed PDCCH.

In an embodiment, the receive processing circuit 180*a* is configured to blind-decode symbols at the control channel candidates according to frequency sub-bands. In an example, for a frequency sub-band, the receive processing circuit 180*a* is configured to collect the symbols of the control channel candidates, and attempt to decode the collected symbols. In an example, the distributed PDCCH can have multiple formats. The receive processing circuit 180*a* can decode respectively according to the multiple formats. In another example, the second electronic device 160*a* can have multiple identifiers. The receive processing circuit 180*a* can de-mask CRC bits respectively according to the multiple identifier. The receive processing circuit 180*a* can perform CRC decoding.

In an example, when the receive processing circuit 180*a* achieves a success in CRC decoding (e.g., no CRC error) in a frequency sub-band, the receive processing circuit 180*a* determines that the frequency sub-band is allocated to the second electronic device 160*a*. Then, the receive processing circuit 180*a* can perform a full decoding to extract the control information and the data in the frequency sub-band.

It is noted that the receive processing circuit 180*a* can be implemented using various techniques. In an example, the receive processing circuit 180*a* is implemented as integrated circuits. In another example, the receive processing circuit 180*a* is implemented as one or more processors executing software instructions.

It is also noted that while single antenna per device is used in the FIG. 1 example, the communication system 100 can be suitably modified to using multiple input, multiple output (MIMO) antenna technology.

Figure 2:
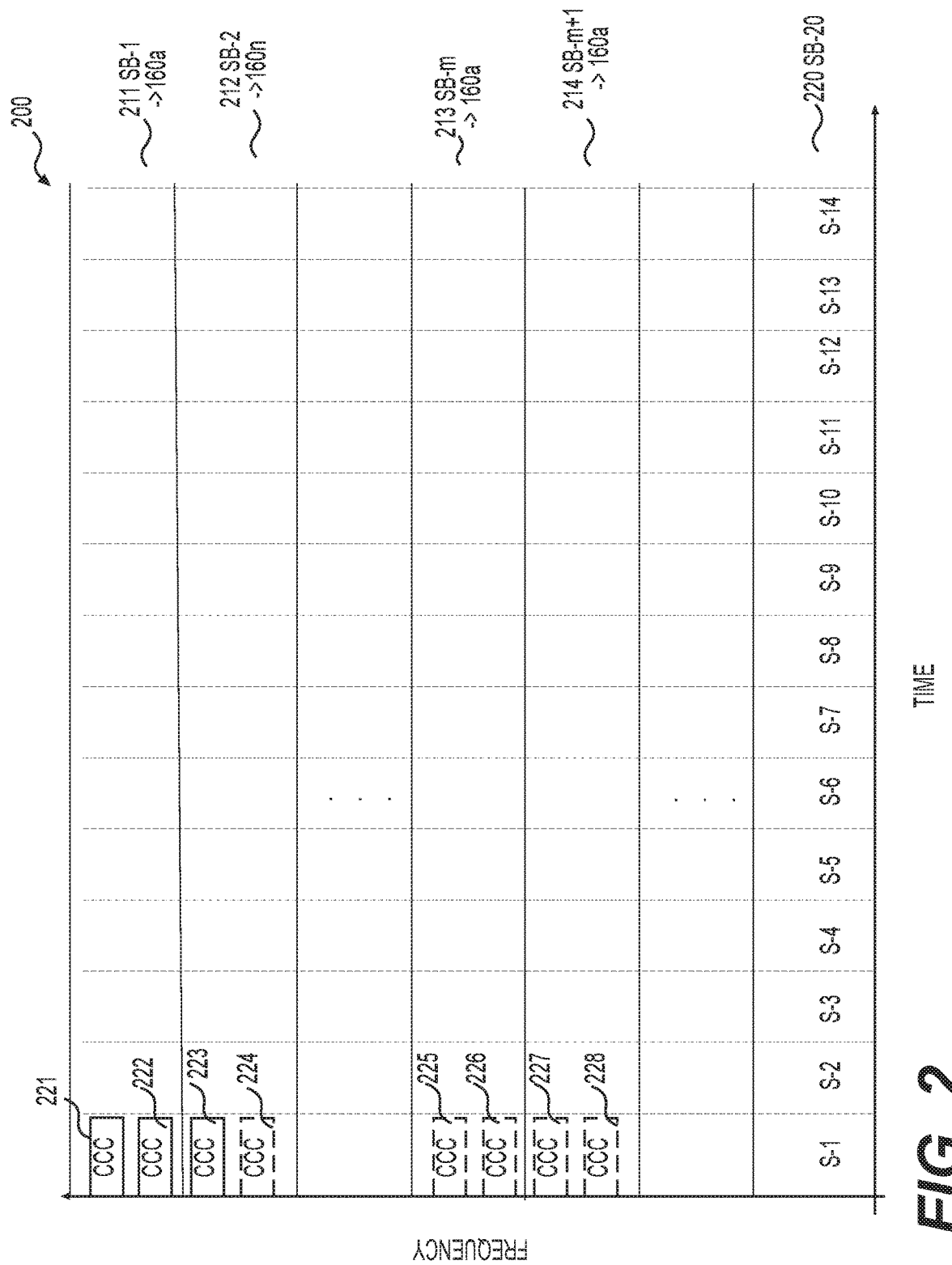
FIG. 2 shows a plot 200 of an exemplary resource structure according to an embodiment of the disclosure.

FIG. 2 shows a plot of a resource structure 200 according to an embodiment of the disclosure. In an example, the resource structure 200 corresponds to a sub-frame in a two dimensional time-frequency domain. In an example, the first electronic device 110 is configured to send a sub-frame according to the resource structure 200.

In the FIG. 2 example, the X-axis denotes to time domain, and the Y-axis denotes to frequency domain. The frequency domain is partitioned into 20 sub-bands SB-1 to SB-20 of the same bandwidth. The time domain is partitioned into 14 symbol periods S-1 to S-14.

The resource structure 200 includes a distributed PDCCH that are formed by control channel candidates (CCCs) 221-228 distributed in frequency sub-bands. In an example, each frequency sub-band includes a control resource set of multiple CCCs, and a CCC includes a plurality of resource elements (REs). The distributed PDCCH selectively uses control channel candidates to deliver the control information. In an embodiment, the control channel candidates can be selected to deliver control information, and can be used to deliver non-control information, such as data to one or more second electronic devices.

In the FIG. 2 example, the sub-band SB-1 is allocated to the second electronic device 160*a*, thus one or more CCCs in the sub-band SB-1, such as CCC 221 and CCC 222, are used to deliver the downlink control information for the second electronic device 160*a*. Further in the FIG. 2 example, the sub-band SB-2 is allocated to the second electronic device 160*n*, and CCC 223 is used to deliver the downlink control information for the second electronic device 160*n*. In the example, when CCC 224 is not occupied by the downlink control information, the CCC 224 can be used to deliver data to the second electronic device 160*n* or other second electronic devices in an example.

In another example, the sub-band SB-m and sub-band SB-m+1 are also allocated to the second electronic device 160*a*. The sub-band SB-m and the sub-band SB-m+1 have the same common configuration as the sub-band SB-1. In an example, the control information in the CCC 221 and CCC 222 is indicative of the common configuration with the sub-band SB-m and the sub-band SB-m+1. Then the CCC 225-228 can be used to deliver data instead of the common configuration.

It is noted that CCCs can exist in the other symbol periods, such as S-2, S-3 and the like. It is also noted that multiple control resource sets for the same second electronic device can be overlapped in frequency and time.

Figure 3:
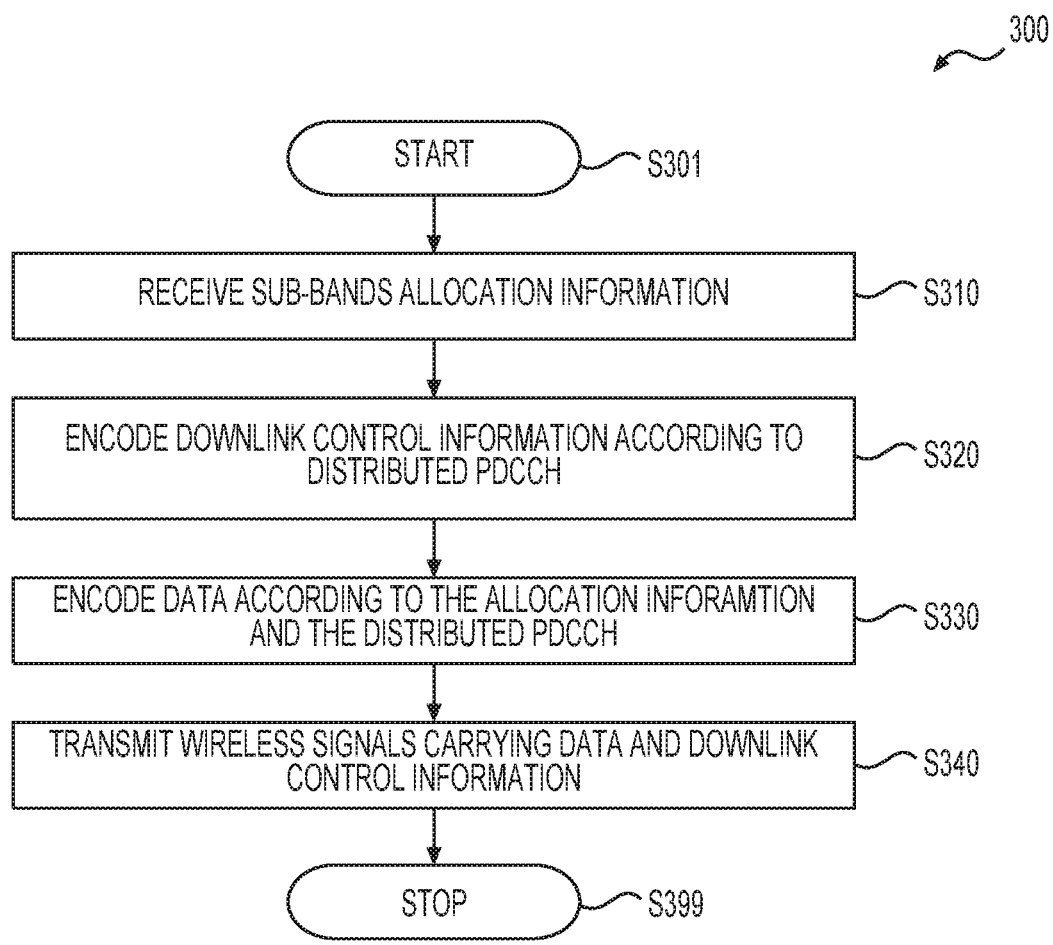
FIG. 3 shows a flow chart outlining a process 300 according to an embodiment of the disclosure.

FIG. 3 shows a flow chart outlining a process 300 according to an embodiment of the disclosure. In an example, the process 300 is executed by the first electronic device 110 to transmit radio frames according to a distributed PDCCH. The process starts at S301 and proceeds to S310.

At S310, sub-band allocation information is received. In an example, the first electronic device 110 receives the sub-band allocation information determined by other devices. In another example, a processor in the first electronic device 110 determines the sub-band allocation information, and provides the sub-band allocation information to the transmit processing circuit 130. The sub-band allocation information includes assignments of sub-bands in a sub-frame to the second electronic devices 160*a*-160*n*. For example, the sub-bands SB-1, SB-m and SB-m+1 are allocated to the second electronic device 160*a*, and the sub-band SB-2 is allocated to the second electronic device 160*n*.

At S320, downlink control information is received and encoded according to the distributed PDCCH. In an example, the transmit processing circuit 130 receives downlink control information for the second electronic device 160*a* and performs channel coding on the downlink control information to generate encoded control bits. In an example, the transmit processing circuit 130 can insert cyclic redundancy check (CRC), and conduct rate matching and the like to generate the encoded control bits. In an example, the transmit processing circuit 130 can also mask the CRC bits with an identifier, such as an identifier of the second electronic device 160*a*, a system information identifier, and the like.

Then, in the example, the transmit processing circuit 130 can perform quadrature phase shift keying (QPSK) modulation, and generate orthogonal frequency-division multiplexing (OFDM) symbols for the encoded control bits. Further, the transmit processing circuit 130 can map the OFDM symbols into the CCC 221 and CCC 222 in the sub-band SB-1 that is allocated to the second electronic device 160*a*.

It is noted that the transmit processing circuit 130 can process downlink control information for other second electronic devices in the same or similar manner.

At S330, data is encoded according to the sub-band allocation information and the distributed PDCCH. In an example, the transmit processing circuit 130 then processes the data to the second electronic device 160*a* according to suitable channel coding technique, such as error detection coding technique, rate matching coding technique, low density parity check (LDPC) coding technique, polar coding technique and the like. The processed data is suitably modulated and multiplexed. In an example, the data can be modulated using suitable modulation technique, such as quadrature phase shift keying (QPSK) and the like, and can be multiplexed using suitable multiplexing technique, such as orthogonal frequency-division multiplexing (OFDM) and the like. Then, the modulated symbols are interleaved and mapped to physical resource elements (REs) in the sub-bands SB-1, SB-m and SB-m+1 that are allocated for data transmission to the second electronic device 160a.

It is noted that the transmit processing circuit 130 can process data to other second electronic devices in the same or similar manner. The transmit processing circuit 130 then generates a digital stream (e.g., output samples) based on the resource element mapping results of the data processing and the downlink control information processing.

At S340, wireless signals are transmitted to carry data and downlink control information. In an example, the transmitting circuit TX 115 receives the digital stream (e.g., output samples), processes the digital stream to generate radio frequency (RF) signals, and causes the antenna 114 to emit electromagnetic waves in the air to carry the digital stream. Then the process proceeds to S399 and terminates.

Figure 4:
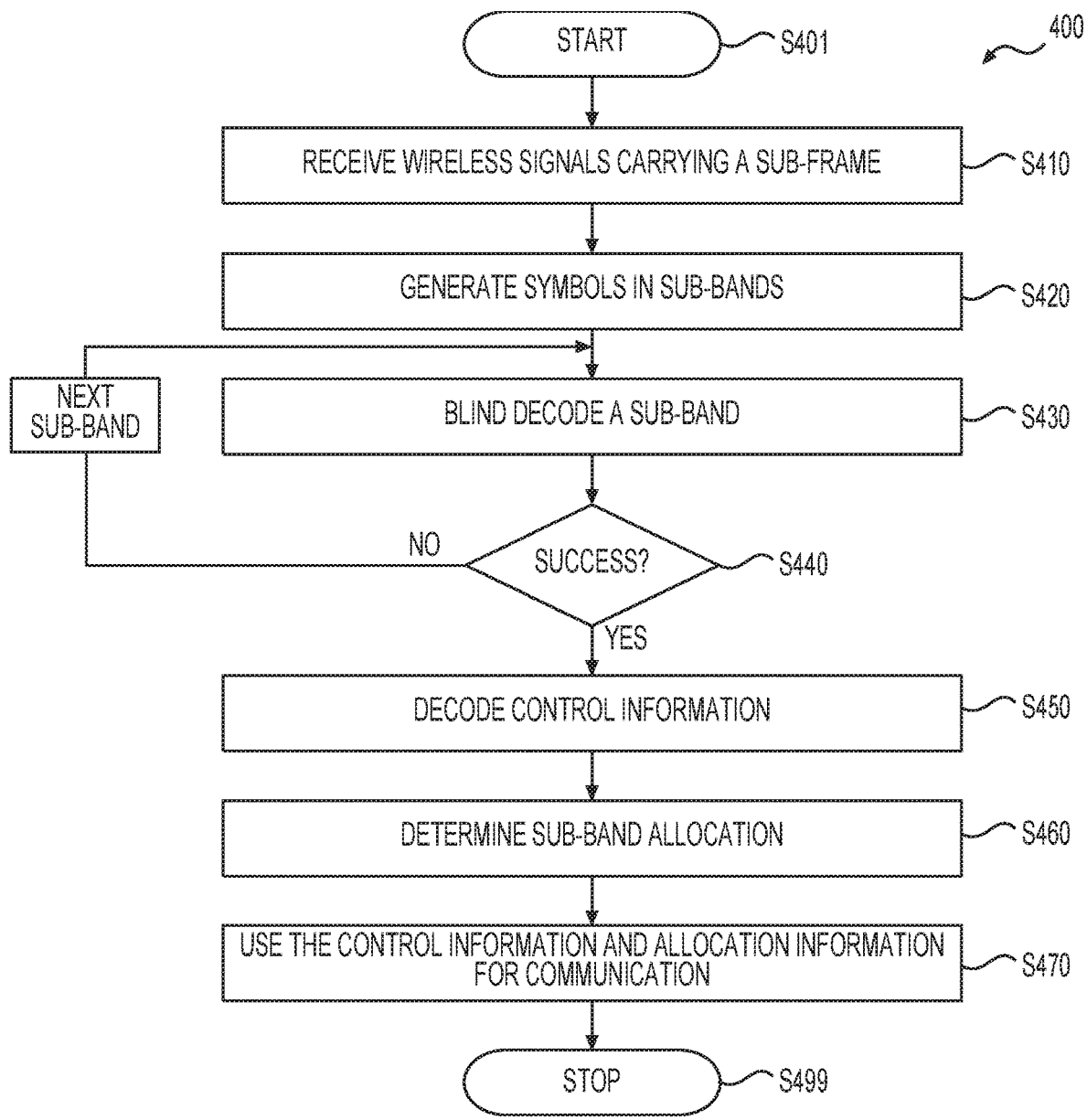
FIG. 4 shows a flow chart outlining a process 400 according to an embodiment of the disclosure.

FIG. 4 shows a flow chart outlining a process 400 according to an embodiment of the disclosure. In an example, the process 400 is executed by the second electronic device 160a. The process starts at S401 and proceeds to S410.

At S410, wireless signals are received. In an example, the receiving circuit RX 166a generates electrical signals in response to captured electromagnetic waves by the antenna 164a, and processes the electrical signals to extract digital samples from the electrical signals. For example, the receiving circuit RX 166a can filter, amplify, down convert, and digitalize the electrical signals to generate the digital samples.

At S420, symbols in frequency sub-bands are generated. In an example, the receive processing circuit 180a receives the digital samples, and performs demodulation on the digital samples to generate symbols for resource elements in the two dimensional time frequency domain.

At S430, a frequency sub-band is blind decoded. In an example, the receive processing circuit 180a collects symbols of the control channel candidates in the frequency sub-band, and attempts to decode the collected symbols. In an example, the distributed PDCCH has multiple formats. The receive processing circuit 180a can attempt to decode respectively according to the multiple formats. In another example, the second electronic device 160a has multiple identifiers. The receive processing circuit 180a can attempt to de-mask CRC bits respectively according to the multiple identifier. Further, the receive processing circuit 180a performs CRC decoding.

At S440, when an attempt achieves a success in CRC decoding (e.g., no CRC error), the process proceeds to S450; otherwise, the process returns to S430 to decode another frequency sub-band.

At S450, control information is decoded. In an example, the receive processing circuit 180a achieves a CRC decoding success in the frequency sub-band SB-1. The receive processing circuit 180a can perform decoding in the frequency sub-band SB-1 according to the attempt that achieves the CRC decoding success to extract the control information.

At S460, frequency sub-band allocation is determined. In an example, the receive processing circuit 180a determines that the frequency sub-band SB-1 is allocated to the second electronic device 160a. Further, in an example, the control information is indicative of other frequency sub-bands, such as SB-m and SB-m+1 and the like that are allocated to the second electronic device 160a.

At S470, communication is performed based on the control information and the frequency sub-band allocation information. For example, the receive processing circuit 180a can decode the data in the frequency sub-bands SB-1, SB-m and SB-m+1 according to the control information. Further, the second electronic device 160a can send uplink data according to the control information in an example. Then the process proceeds to S499 and terminates.

Figure 5:
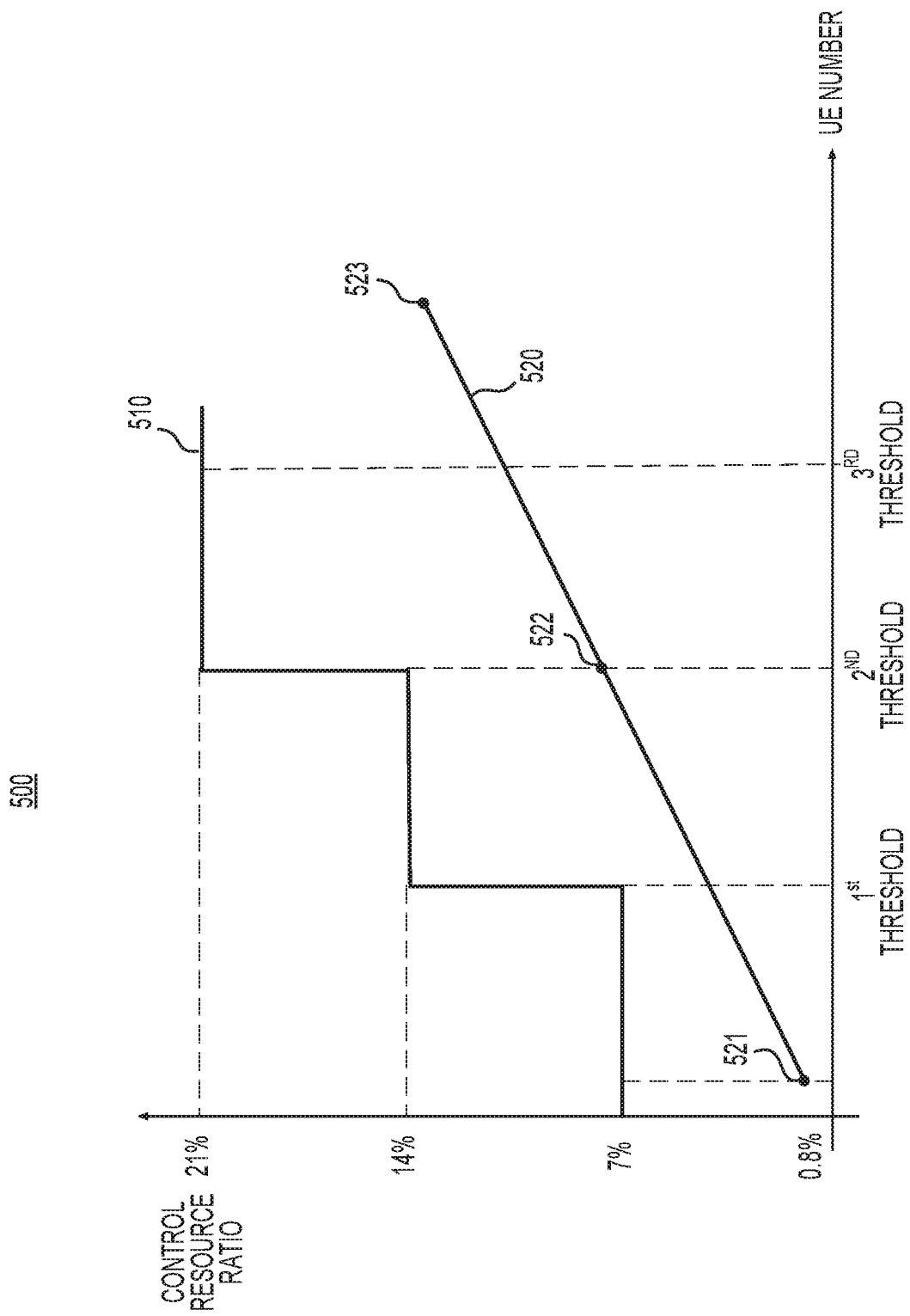
FIG. 5 shows a plot 500 according to an embodiment of the disclosure.

FIG. 5 shows a plot 500 according to an embodiment of the disclosure. The plot 500 shows relationship of of control resource ratio to the number of user equipment, such as the number of the second electronic devices 160a-160n for two examples.

In the plot 500, the X-axis denotes to the number of user equipment, and the Y axis denotes to the control resource ratio. In an example, the control resource ratio is the ratio of the resource elements that are used by a physical downlink control channel (PDCCH) to the total number of resource elements in a sub-frame.

The plot 500 includes a first curve 510 for a related example, and a second curve 520 for an example in the disclosure. The related example uses a centralized PDCCH, and the example in the disclosure uses a distributed PDCCH.

In the related example, the centralized PDCCH occupies first one or two or three symbols in the time domain, and occupies across most of the frequency domain to deliver DCI messages. For example, when the number of second electronic devices 160a-160n is less than a first threshold (e.g., 10), the centralized PDCCH occupies the first symbol in the time domain, and occupies across most of the frequency domain, thus the control resource ratio is about 7% (1/14); when the number of second electronic devices 160a-160n is between the first threshold and a second threshold (e.g., 20), the centralized PDCCH occupies the first two symbols in the time domain, and occupies across most of the frequency domain, thus the control resource ratio is about 14% (1/7); and when the number of second electronic devices 160a-160n is between the second threshold and a third threshold (e.g., 30), the centralized PDCCH occupies the first three symbols in the time domain, and occupies across most of the frequency domain, thus the control resource ratio is about 21% (3/14).

In the distributed PDCCH example, according to an aspect of the disclosure, bits irrelevant to specification within the frequency sub-band, such as bits for specifying the frequency sub-band, can be removed from the control information. In an example, the distributed PDCCH can achieve 37% resource element reduction comparing to the centralized PDCCH. In addition, the control resource ratio of the distributed PDCCH is relatively linear to the number of second electronic devices 160a-160n.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus, comprising:
  a receiving circuit configured to receive signals transmitted from another apparatus, which distributes control information by a plurality of frequency sub-bands to a plurality of end user mobile terminals, the apparatus being one of the plurality of end user mobile terminals, digitalize the received signals, and generate digital samples based on the digitalized signals, the signals having the plurality of frequency sub-bands allocated as transmission resources, a specific frequency sub-band being allocated to the apparatus is to carry both data and the control information to the apparatus, wherein a ratio of a number of resource elements used for the distribution of the control information to a total number of resource elements is linear to a number of the plurality of end user mobile terminals; and a baseband processing circuit configured to receive the digital samples, process the digital samples to generate symbols in respective frequency sub-bands, and decode the symbols in the respective frequency sub-bands to determine the specific frequency sub-band that is allocated to the apparatus.

2. The apparatus of claim 1, wherein the baseband processing circuit is configured to decode symbols at pre-determined resource elements in the respective frequency sub-bands to determine the specific frequency sub-band that is allocated to the apparatus.

3. The apparatus of claim 1, wherein the specific frequency sub-band being allocated to the apparatus is to carry downlink control information for the apparatus that includes at least one of modulation and coding scheme, redundancy version, transmit power control command for uplink control channel, and precoding information.

4. The apparatus of claim 1, wherein the baseband processing circuit is configured to decode the symbols in the respective frequency sub-bands based on an identifier of the apparatus to determine the specific frequency sub-band that is allocated to the apparatus.

5. The apparatus of claim 1, wherein the specific frequency sub-band is allocated to the apparatus to carry the control information that is indicative of a common configuration with another frequency sub-band.

6. A method of communication, comprising:
receiving, signals transmitted from a first apparatus to a second apparatus, the first apparatus distributing control information by a plurality of frequency sub-bands to a plurality of end user mobile terminals including the second apparatus, the signals having the plurality of frequency sub-bands allocated as transmission resources, a specific frequency sub-band being allocated to the second apparatus is to carry both data and the control information to the second apparatus, wherein a ratio of a number of resource elements used for the distribution of the control information to a total number of resource elements is linear to a number of the plurality of end user mobile terminals;
digitalizing the received signals;
generating digital samples based on the digitalized signals;
processing the digital samples to generate symbols in respective frequency sub-bands; and
decoding the symbols in the respective frequency sub-bands to determine the specific frequency sub-band that is allocated to the second apparatus.

7. The method of claim 6, wherein decoding the symbols in the respective frequency sub-bands to determine the specific frequency sub-band that is allocated to the second apparatus further comprises:

decoding the symbols at pre-determined resource elements in the respective frequency sub-bands to determine the specific frequency sub-band that is allocated to the second apparatus.

8. The method of claim 6, further comprising:
decoding the symbols at pre-determined resource elements that are used to carry downlink control information including at least one of modulation and coding scheme, redundancy version, coding rate, transmit power control command for uplink control channel, and precoding information.

9. The method of claim 6, wherein decoding the symbols in the respective frequency sub-bands to determine the specific frequency sub-band that is allocated to the second apparatus further comprises:
decoding the symbols in the respective frequency sub-bands based on an identifier of the second apparatus to determine the specific frequency sub-band that is allocated to the second apparatus.

10. The method of claim 6, further comprising:
identifying another frequency sub-band with a common configuration of the specific frequency sub-band based on the control information.

11. An apparatus, comprising:
a baseband processing circuit configured to encode control information with data into symbols in a specific frequency sub-band that is allocated to other apparatus, and generate a digital stream based on the symbols in the specific frequency sub-band and other symbols in other frequency sub-bands, the symbols and the other symbols generated based on digitalized signals; and
a transmitting circuit configured to distribute the control information by a plurality of frequency sub-bands to a plurality of end user mobile terminals including the other apparatus, which receives signals based on the digital stream, wherein a ratio of a number of resource elements used for the distribution of the control information to a total number of resource elements is linear to a number of the plurality of end user mobile terminals.

12. The apparatus of claim 11, wherein the baseband processing circuit is configured to encode the control information into symbols at pre-determined resource elements in the specific frequency sub-band.

13. The apparatus of claim 11, wherein the baseband processing circuit is configured to encode downlink control information that includes at least one of modulation and coding scheme, redundancy version, transmit power control command for uplink control channel, and precoding information into the symbols in the specific frequency sub-band that is allocated to the other apparatus.

14. The apparatus of claim 11, wherein the baseband processing circuit is configured to encode the control information based on an identifier of the other apparatus.

15. The apparatus of claim 11, wherein the baseband processing circuit is configured to encode the control information that is indicative of a common configuration with another frequency sub-band.

16. A method for communication, comprising:
encoding, by a first apparatus, control information with data into symbols in a specific frequency sub-band that is allocated to a second apparatus;
generating a digital stream based on the symbols in the specific frequency sub-band and other symbols in other frequency sub-bands, the symbols and the other symbols generated based on digitalized signals; and distributing, from the first apparatus, the control information by a plurality of frequency sub-bands to a plurality of end user mobile terminals including the second apparatus, which receives wireless signals based on the digital stream, wherein a ratio of a number of resource elements used for the distribution of the control information to a total number of resource elements is linear to a number of the plurality of end user mobile terminals.

17. The method of claim 16, wherein encoding, by the first apparatus, the control information to the second apparatus with the data to the second apparatus into the symbols in the specific frequency sub-band that is allocated to the second apparatus further comprises:

encoding the control information into symbols at predetermined resource elements in the specific frequency sub-band.

18. The method of claim 16, wherein encoding, by the first apparatus, the control information to the second apparatus with the data to the second apparatus into the symbols in the specific frequency sub-band that is allocated to the second apparatus further comprises:

encoding downlink control information that includes at least one of modulation and coding scheme, redundancy version, transmit power control command for uplink control channel, and precoding information into the symbols in the specific frequency sub-band that is allocated to the second apparatus.

19. The method of claim 16, wherein encoding, by the first apparatus, the control information to the second apparatus with the data to the second apparatus into the symbols in the specific frequency sub-band that is allocated to the second apparatus further comprises:

encoding the control information based on an identifier of the second apparatus.

20. The method of claim 16, wherein encoding, by the first apparatus, the control information to the second apparatus with the data to the second apparatus into the symbols in the specific frequency sub-band that is allocated to the second apparatus further comprises:

encoding the control information that is indicative of a common configuration with another frequency sub-band.

* * * * *